(12) United States Patent
Faruque et al.

(10) Patent No.: US 10,336,280 B2
(45) Date of Patent: Jul. 2, 2019

(54) AIRBAG ASSEMBLY

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 98 days.

(21) Appl. No.: 15/787,662

(22) Filed: Oct. 18, 2017

(65) Prior Publication Data

US 2019/0111878 A1 Apr. 18, 2019

(51) Int. Cl.
| | |
|---|---|
| *B60R 21/207* | (2006.01) |
| *B60R 21/231* | (2011.01) |
| *B60R 21/233* | (2006.01) |
| *B60R 21/261* | (2011.01) |
| *B60R 21/2338* | (2011.01) |

(52) U.S. Cl.
CPC .......... *B60R 21/207* (2013.01); *B60R 21/233* (2013.01); *B60R 21/2338* (2013.01); *B60R 21/261* (2013.01); *B60R 2021/23153* (2013.01); *B60R 2021/23386* (2013.01); *B60R 2021/2615* (2013.01)

(58) Field of Classification Search
CPC . B60R 21/207; B60R 21/261; B60R 21/2338; B60R 21/233; B60R 2021/23386; B60R 2021/23153; B60R 2021/2615
See application file for complete search history.

(56) References Cited

U.S. PATENT DOCUMENTS

| | | | | |
|---|---|---|---|---|
| 3,451,694 A | * | 6/1969 | Hass | B60R 21/233 280/743.1 |
| 3,747,952 A | * | 7/1973 | Graebe | B60R 21/205 137/67 |
| 3,795,412 A | * | 3/1974 | John | B60R 21/08 180/274 |
| 4,227,717 A | * | 10/1980 | Bouvier | B60R 21/16 280/753 |
| 8,087,690 B2 | * | 1/2012 | Kim | B60R 21/214 280/729 |
| 8,651,522 B2 | | 2/2014 | Hirth et al. | |
| 9,296,359 B2 | * | 3/2016 | Pan | B60R 21/233 |
| 9,789,840 B2 | * | 10/2017 | Farooq | B60R 21/231 |

(Continued)

FOREIGN PATENT DOCUMENTS

| | | |
|---|---|---|
| CN | 103332162 A | 10/2013 |
| CN | 106696884 A | 5/2017 |

(Continued)

*Primary Examiner* — Drew J Brown
(74) *Attorney, Agent, or Firm* — Frank A. MacKenzie; Bejin Bieneman PLC (57) ABSTRACT

An airbag assembly includes a plurality of pipes each having a distal end. The pipes are inflatable to an inflated position in which the distal ends are positioned in a circular configuration. The airbag assembly includes a plurality of interconnecting panels in alternating arrangement with the plurality of pipes. Each interconnecting panel is fixed to adjacent ones of the plurality of pipes. The airbag assembly includes an uninflatable panel fixed to the distal ends of the plurality of pipes.

20 Claims, 8 Drawing Sheets

(56) References Cited

U.S. PATENT DOCUMENTS

| | | | | |
|---|---|---|---|---|
| 9,845,067 | B2* | 12/2017 | Morris | B60R 21/233 |
| 10,065,594 | B2* | 9/2018 | Fukawatase | B60R 21/233 |
| 2012/0133114 | A1* | 5/2012 | Choi | B60R 21/214 |
| | | | | 280/728.2 |
| 2017/0015266 | A1* | 1/2017 | El-Jawahri | B60R 21/01512 |
| 2018/0050654 | A1* | 2/2018 | Spahn | B60R 21/205 |
| 2018/0065585 | A1* | 3/2018 | Jaradi | B60R 21/233 |
| 2018/0154858 | A1* | 6/2018 | Aranzulla | B60R 21/233 |
| 2018/0361981 | A1* | 12/2018 | Faruque | B60R 21/261 |

FOREIGN PATENT DOCUMENTS

| | | |
|---|---|---|
| DE | 19540911 C2 | 4/1999 |
| DE | 102015117195 A1 | 4/2017 |
| GB | 2299306 A | 10/1996 |

\* cited by examiner

AIRBAG ASSEMBLY

BACKGROUND

A vehicle may include seats disposed in a passenger cabin. The seats may have a variety of safety features, such as, airbags, seatbelts, etc. These features are subject to packaging constraints within the passenger cabin.

DETAILED DESCRIPTION

An airbag assembly includes a plurality of pipes each having a distal end. The pipes are inflatable to an inflated position in which the distal ends are positioned in a circular configuration. The airbag assembly includes a plurality of interconnecting panels in alternating arrangement with the plurality of pipes. Each interconnecting panel is fixed to adjacent ones of the plurality of pipes. The airbag assembly includes an uninflatable panel fixed to the distal ends of the plurality of pipes.

The pipes in the inflated position may be elongated along pipe axes.

The plurality of interconnecting panels may be elongated along axes parallel to the pipe axes.

Each pipe may include a proximal end. The plurality of interconnecting panels may be fixed to the pipes between the proximal ends and the distal ends.

The airbag assembly may include a plurality of tethers extending between the pipes.

Each tether may extend between nonadjacent pipes.

The pipes and interconnecting panels may define a cavity therebetween. The airbag assembly may include a middle pipe in the cavity. Each of the plurality of pipes and the middle pipe may have a length. The length of the middle pipe may be less than the lengths of the pipes.

The middle pipe may have a distal end and the uninflatable panel may be fixed to the distal end of the middle pipe.

The airbag assembly may include an inflator, a manifold in fluid communication with the inflator, and a plurality of fill tubes. Each of the fill tubes may be in fluid communication with the manifold and a respective one of the pipes.

The distal ends of the plurality of pipes may be spaced from each other.

A seat assembly includes a seat back. The seat assembly includes a plurality of pipes each having a proximal end supported on the seat back and a distal end. The pipes are inflatable to an inflated position in which the distal ends are positioned in a circular configuration. The seat assembly includes a plurality of interconnecting panels in alternating arrangement with the plurality of pipes. Each interconnecting panel is fixed to adjacent ones of the plurality of pipes. The seat assembly includes an uninflatable panel fixed to the distal ends of the plurality of pipes.

The pipes in the inflated position may be elongated along pipe axes.

The plurality of interconnecting panels may be elongated along axes parallel to the pipe axes.

Each pipe may include a proximal end. The plurality of interconnecting panels may be fixed to the pipes between the proximal ends and the distal ends.

The seat assembly may include a plurality of tethers extending between the pipes.

Each tether may extend between nonadjacent pipes.

The pipes and interconnecting panels may define a cavity therebetween. The seat assembly may include a middle pipe in the cavity. Each of the plurality of pipes and the middle pipe may have a length. The length of the middle pipe may be less than the lengths of the pipes.

The middle pipe may have a distal end and the uninflatable panel may be fixed to the distal end of the middle pipe.

The seat assembly may include an inflator, a manifold in fluid communication with the inflator, and a plurality of fill tubes. Each of the fill tubes may be in fluid communication with the manifold and a respective one of the pipes.

The distal ends of the plurality of pipes may be spaced from each other.

With reference to the Figures, wherein like numerals indicate like parts throughout the several views, an airbag assembly 36 is generally shown. The airbag assembly 36 includes a plurality of pipes 38 each having a distal end 42. The pipes 38 are inflatable to an inflated position in which the distal ends 42 are positioned in a circular configuration. The airbag assembly 36 includes a plurality of interconnecting panels 44 in alternating arrangement with the plurality of pipes 38. Each interconnecting panel 44 is fixed to adjacent ones of the plurality of pipes 38. The airbag assembly 36 includes an uninflatable panel 46 fixed to the distal ends 42 of the plurality of pipes 38.

During or before a vehicle impact, e.g., a front impact, the pipes 38 may inflate to the inflated position, as shown, for example, in FIGS. 2-7B. In the inflated position, the uninflatable panel 46 is positioned to receive a head 74 of an occupant 72 during the vehicle impact. Because the distal ends 42 of the pipes 38 are positioned in the circular configuration on the uninflatable panel 46, the uninflatable panel 46 receives the head 74 of the occupant 72 at a location on the uninflatable panel 46 between the pipes 38, i.e., inside a circular perimeter on which the pipes 38 connect to the uninflatable panel 46. When the head 74 of the occupant 72 impacts the uninflatable panel 46 between the pipes 38, the uninflatable panel 46 deforms to absorb energy from the occupant 72. The pipes 38 support the uninflatable panel 46 as the head 74 impacts the uninflatable panel 46 to limit forward movement of the occupant 72. The pipes 38 may deform, e.g., compress, buckle, etc., to absorb energy from the occupant 72.

Figure 1:
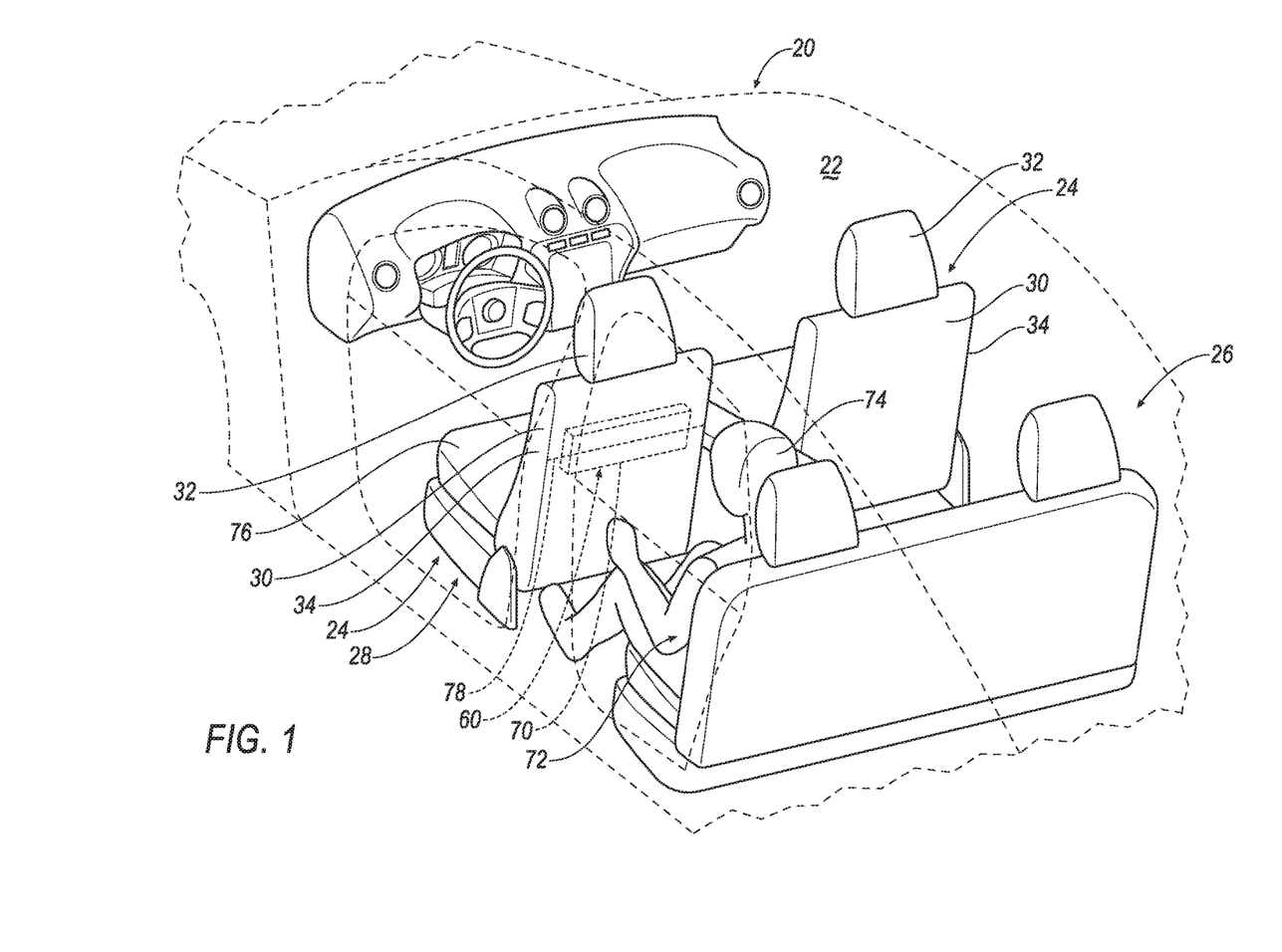
FIG. 1 is a perspective view of a vehicle with a seat assembly and an airbag assembly in an uninflated position.
Figure 2:
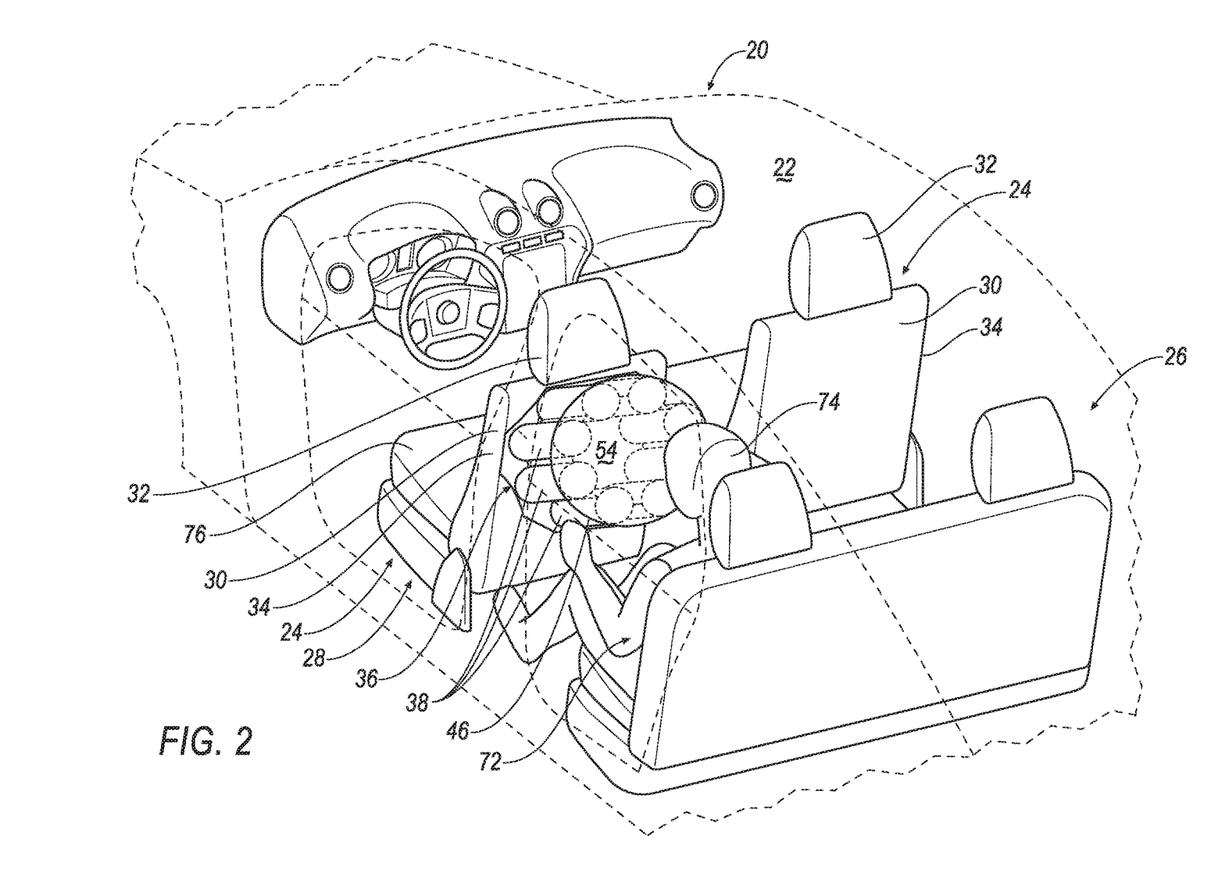
FIG. 2 is a perspective view of the vehicle with the seat assembly and the airbag assembly in an inflated position.
Figure 3:
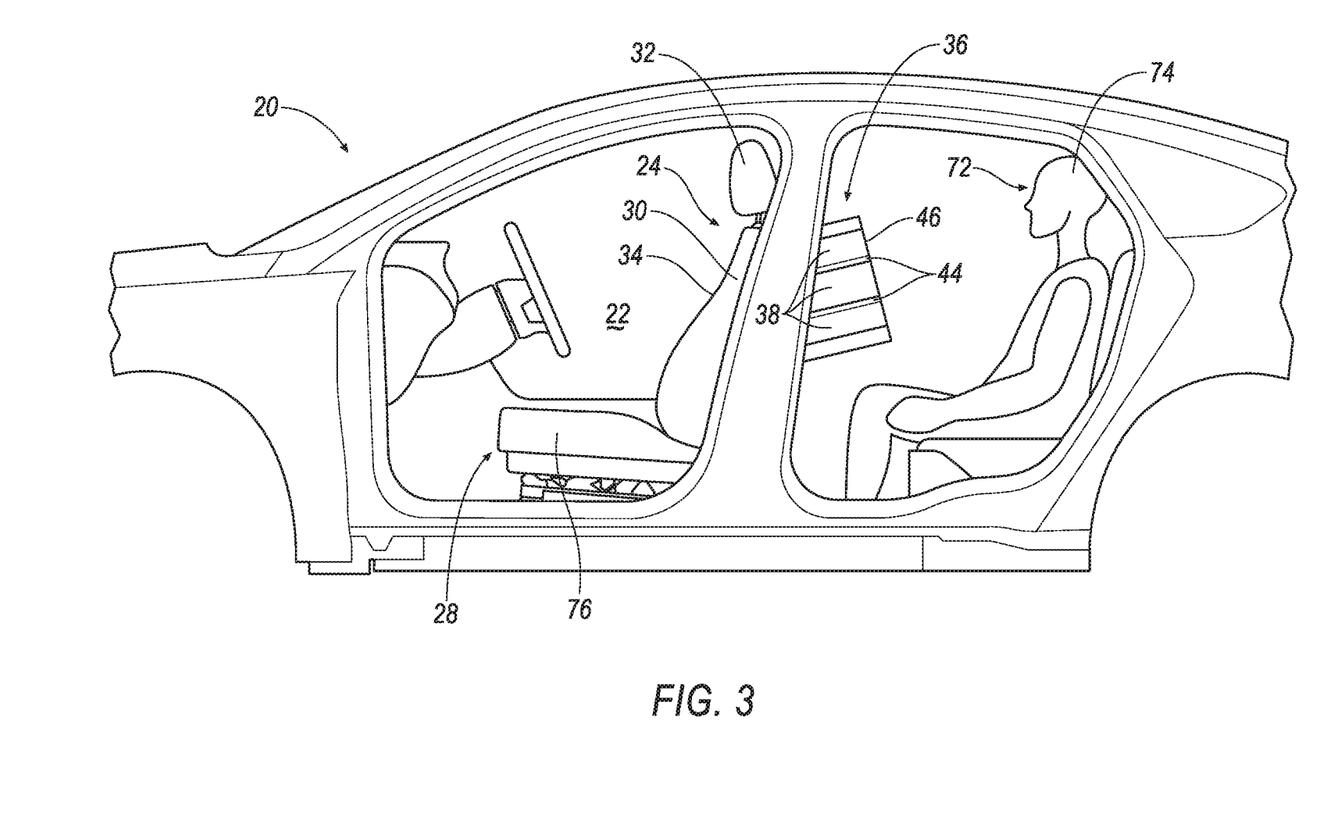
FIG. 3 is a side view of the vehicle with the seat assembly and the airbag assembly in the inflated position.

With reference to FIGS. 1-3, a vehicle 20 is generally shown. The vehicle 20 may include a passenger cabin 22 to house occupants 72, if any, of the vehicle 20. The passenger cabin 22 may include one or more front seats 24 disposed at a front of the passenger cabin 22 and one or more back seats 26 disposed behind the front seats 24. The passenger cabin 22 may also include third-row seats (not shown) at a rear of the passenger cabin 22. In FIG. 1, the front seats 24 are shown to be bucket seats, but the front seats 24 may be other types. The position and orientation of the seats and components thereof may be adjustable by an occupant.

With continued reference to FIGS. 1-3, the vehicle 20 includes a seat assembly 28. The seat assembly 28 is shown as being one of the fronts seats 24, however, the seat assembly 28 may be one of the back seats 26, one of the third-row seats, or any other suitable seat. The vehicle 20 is shown as including only one seat assembly 28, however, there may be any suitable number of seat assemblies 28.

The seat assembly 28 may include a seat back 30, a seat bottom 76, and a headrest 32. The headrest 32 may be supported by the seat back 30 and may be stationary or movable relative to the seat back 30. The seat back 30 may be supported by the seat bottom 76 and may be stationary or movable relative to the seat bottom 76. The seat back 30, the seat bottom 76, and/or the headrest 32 may be adjustable in multiple degrees of freedom. Specifically, the seat back 30, the seat bottom 76, and/or the headrest 32 may themselves be adjustable, in other words, adjustable components within the seat back 30, the seat bottom 76, and/or the headrest 32, and/or may be adjustable relative to each other.

The seat bottom 76 and/or the seat back 30 may include a frame (not shown) and a covering 34 supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The covering 34 may include upholstery and padding. The upholstery may be formed of cloth, leather, faux leather, or any other suitable material. The upholstery may be stitched in panels around the frame. The padding may be between the upholstery and the frame, and may be foam or any other suitable material.

Figure 5:
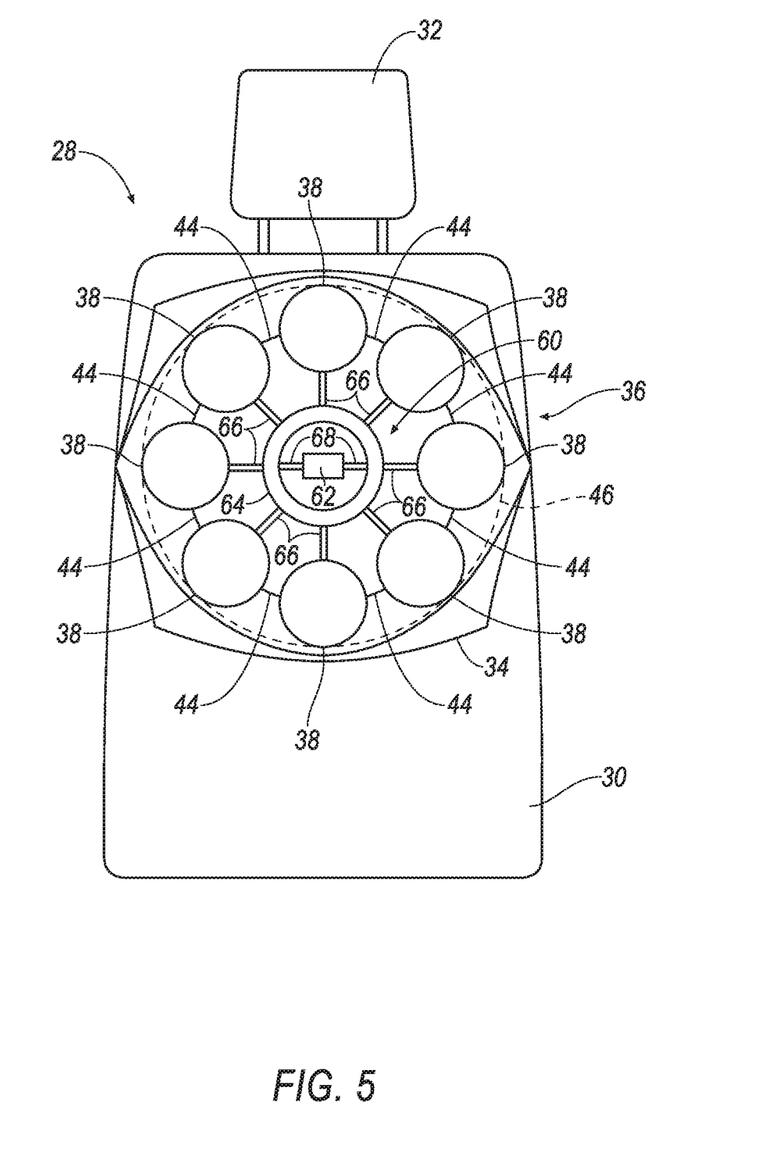
FIG. 5 is a plan view of the seat assembly and the airbag assembly in the inflated position.

With reference to FIGS. 1 and 5, the seat assembly 28 may include an airbag module 60. The airbag module 60 may include a housing 70 and the airbag assembly 36. The airbag module 60 may be covered by the covering 34. The airbag assembly 36 may be disposed in the housing 70 in an uninflated position, as shown in FIG. 1. The housing 70 may provide a reaction surface for the airbag assembly 36 in the inflated position. The housing 70 may be supported by the frame of the seat assembly 28, the headrest 32, or any other suitable component. The housing 70 may be formed of any material, e.g., a rigid polymer, a metal, a composite, etc.

The airbag assembly 36, including the plurality of pipes 38, the interconnecting panels 44, and the uninflatable panel 46, may be formed of a woven polymer or any other material. As one example, the airbag assembly 36 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The plurality of pipes 38, the interconnecting panels 44, and the uninflatable panel 46 may all be formed of the same material, different materials, or any suitable combination of same and/or different materials.

With reference to FIG. 1, the covering 34 may include a tear seam 78. The tear seam 78 may be designed to tear apart when subjected to a tensile force above a threshold magnitude. In other words, the covering 34 on one side of the tear seam 78 separates from the covering 34 on the other side of the tear seam 78 when the force is above the threshold magnitude. The threshold magnitude may be chosen to be greater than forces from, e.g., inadvertent pushing against the seat back 30 by the occupant 72, but be less than forces from the deployment of the airbag assembly 36. The tear seam 78 may be, for example, a line of perforations through the covering 34, e.g., the upholstery, a line of thinner upholstery material than the rest of the upholstery, etc. The tear seam 78 may be adjacent the airbag module 60; that is, nothing is between the tear seam 78 and the airbag module 60.

Figure 4:
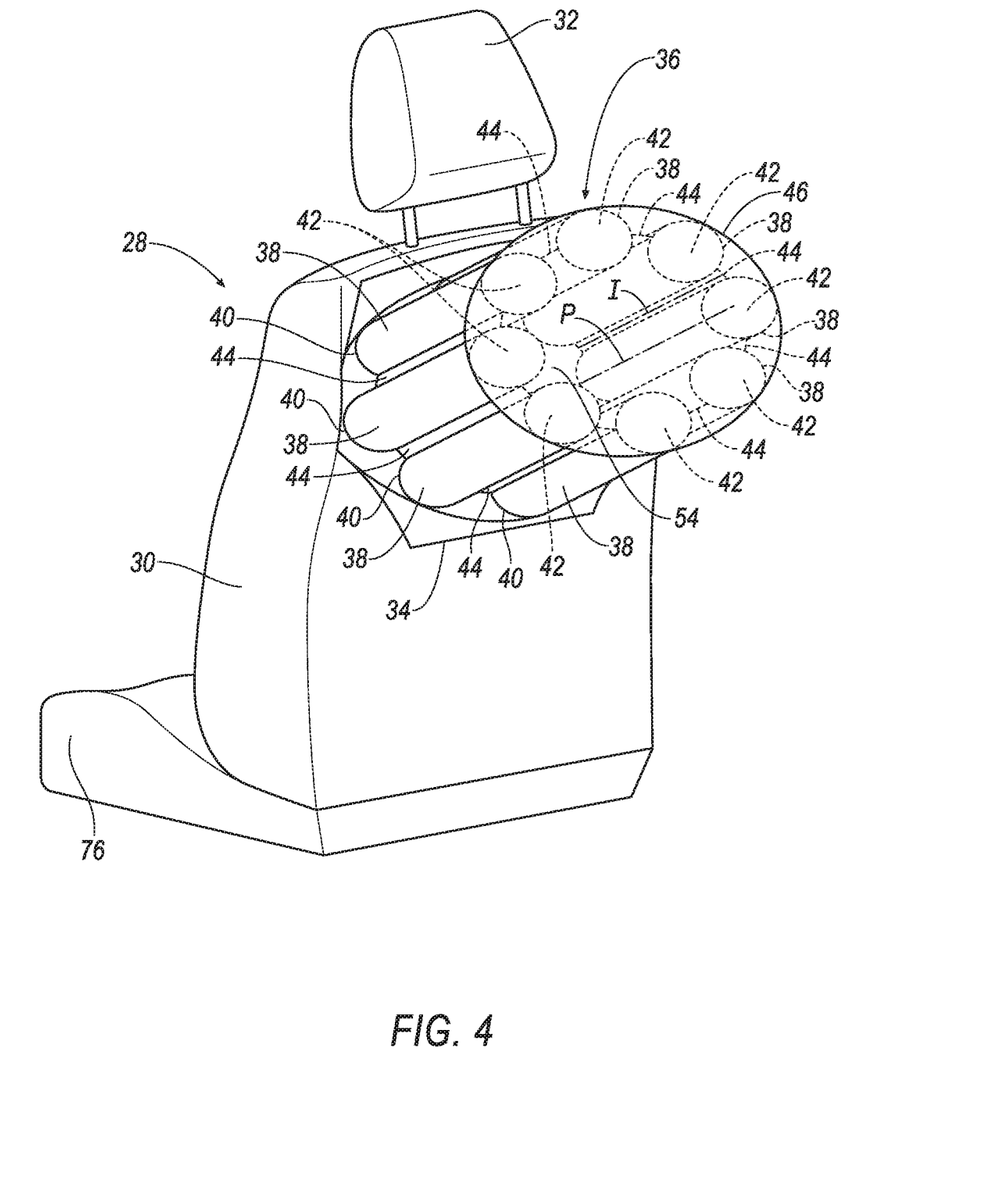
FIG. 4 is a perspective view of the seat assembly and the airbag assembly in the inflated position.

With reference to FIGS. 2-4, the airbag assembly 36 includes the plurality of pipes 38. The pipes 38 each define an inflation chamber (not numbered) that is inflated when the pipes 38 are inflated to the inflated position. Each pipe 38 may include a proximal end 40 spaced from the distal end 42. The pipes 38 may include a length from the proximal end 40 to the distal end 42. The inflation chamber of each pipe 38 may extend from the proximal end 40 to the distal end 42. The proximal ends 40 are supported on the seat back 30. For example, the proximal ends 40 may be supported on the housing 70, and the housing 70 may be supported on the seat back 30. The pipes 38 in the inflated position may have a cross section that is generally circular, or any other suitable shape, for example, triangular, elliptical, rectangular, etc.

The pipes 38 in the inflated position may be elongated along pipe axes P, respectively (one example of the pipe axis P is shown in FIG. 4). For example, each pipe axis P may extend from the proximal end 40 to the distal end 42 of one of the pipes 38. The pipes 38, and the pipe axis P, are shown as all being parallel to one another, however, the pipes 38, and the pipe axis P, may be in any suitable configuration, for example a conical configuration, a rectangular configuration, etc.

As set forth above, the distal ends 42 of the pipes 38 are positioned in the circular configuration. In other words, the pipe axes P are spaced from each other in a circle. For example, the uninflatable panel 46 may have a substantially circular shape, and each of the distal ends 42 may be fixed to the uninflatable panel 46 near a radial edge of the uninflatable panel 46.

With continued reference to FIGS. 2-4, the airbag assembly 36 includes the plurality of interconnecting panels 44 in alternating arrangement with the plurality of pipes 38. In other words, each pipe 38 extends from one interconnecting panel 44 to another interconnecting panel 44, and each interconnecting panel 44 extends from one pipe 38 to another pipe 38. For example, the number of pipes 38 may be equal to the number of interconnecting panels 44. Each pipe 38 may be adjacent to, i.e., fixed to, two of the interconnecting panels 44. Likewise, each interconnecting panel 44 may be adjacent to, i.e., fixed to, two of the pipes 38. For example, the distal ends 42 of the plurality of pipes 38 may be spaced from each other, and one of the interconnecting panels 44 may be between two of the pipes 38.

The interconnecting panels 44 are uninflatable, i.e., the uninflatable panel 46 is not inflated, and does not include an inflation chamber between the pipes 38. The interconnecting panels 44 are exterior to, and separated from, the inflation chambers of the pipes 38, i.e., are not in communication with the inflation chambers of the pipes 38. As an example, the interconnecting panels 44 may be a single layer of material.

In the inflated position, the plurality of interconnecting panels 44 may be elongated along axes I, respectively (one example of the axis I is shown in FIG. 4). The axes I may be parallel to the pipe axes P, i.e., the configuration of the interconnecting panels 44 may substantially correspond to the configuration of the pipes 38. The plurality of interconnecting panels 44 may be fixed to the pipes 38 between the proximal ends 40 and the distal ends 42. For example, the interconnecting panels 44 may extend completely from the proximal end 40 to the distal end 42, or the interconnecting panels 44 may extend from near the proximal end 40 to near the distal end 42. The interconnecting panels 44 may be fixed to the pipes 38 in any suitable way, e.g., sewing, gluing, integral formation, etc.

With continued reference to FIGS. 2-4, the airbag assembly 36 includes the uninflatable panel 46 fixed to the distal ends 42 of the plurality of pipes 38. The uninflatable panel 46 is uninflatable, i.e., the uninflatable panel 46 is not inflated, and does not include an inflation chamber between the pipes 38. As an example, the uninflatable panel 46 may be a single layer of material. The uninflatable panel 46 may cover the inflation chambers of the pipes 38 at the distal ends 42. The uninflatable panel 46 may have a shape that is generally circular, or any suitable shape, such as, e.g., triangular, rectangular, elliptical, etc. The uninflatable panel 46 may be fixed to the distal ends 42 of the plurality of pipes 38 in any suitable way, e.g., sewing, gluing, integral formation, etc.

The uninflatable panel 46 may cap each of the pipes 38. For example, the pipes 38 may be hollow with an opening at each distal end 42, and the uninflatable panel 46 may seal off each of the pipes 38. As another example, each pipe 38 may include a cap (not shown) at the distal end 42, and the uninflatable panel 46 may be fixed to each cap.

With reference to FIGS. 2 and 4, the pipes 38 and interconnecting panels 44 may define a cavity 54 therebetween. The cavity 54 may be between the uninflatable panel 46 and the seat back 30. The pipes 38 and the interconnecting panels 44 may extend completely around the cavity 54, e.g., may completely encircle the cavity 54. The cavity 54 may have a shape that is substantially cylindrical, or any other suitable shape. During a vehicle impact, the head 74 of the occupant 72 may exert a force on the uninflatable panel 46, such that the head 74 and the uninflatable panel 46 may enter the cavity 54.

With reference to FIG. 5, the airbag module 60 may include an inflator 62, a manifold 64 in fluid communication with the inflator 62, and a plurality of fill tubes 66, each of the fill tubes 66 in fluid communication with the manifold 64 and a respective one of the pipes 38. At least the inflator 62 may be disposed in the housing 70. The inflator 62 may be connected to the airbag assembly 36, i.e., the pipes 38, via intermediate fill tubes 68, the manifold 64, and the plurality of fill tubes 66. The interconnecting panels 44 and the uninflatable panel 46 reduce the size of the inflation chambers of the pipes 38, which decreases the amount of inflation medium required to inflate the pipes 38 and decreases the size of the inflator 62.

Upon receiving a signal from, e.g., a vehicle controller, the inflator 62 may inflate the manifold 64 via the intermediate fill tubes 68 with an inflatable medium, such as a gas. The inflatable medium, such as a gas, may pass from the manifold 64 through the plurality of fill tubes 66 to a respective one of the pipes 38. For example, the number of pipes 38 may equal the number of fill tubes 66. The inflator 62 may be, for example, a pyrotechnic inflator that uses a chemical reaction to drive inflation medium to the pipes 38. The inflator 62 may be of any suitable type, for example, a cold-gas inflator.

Figure 6:
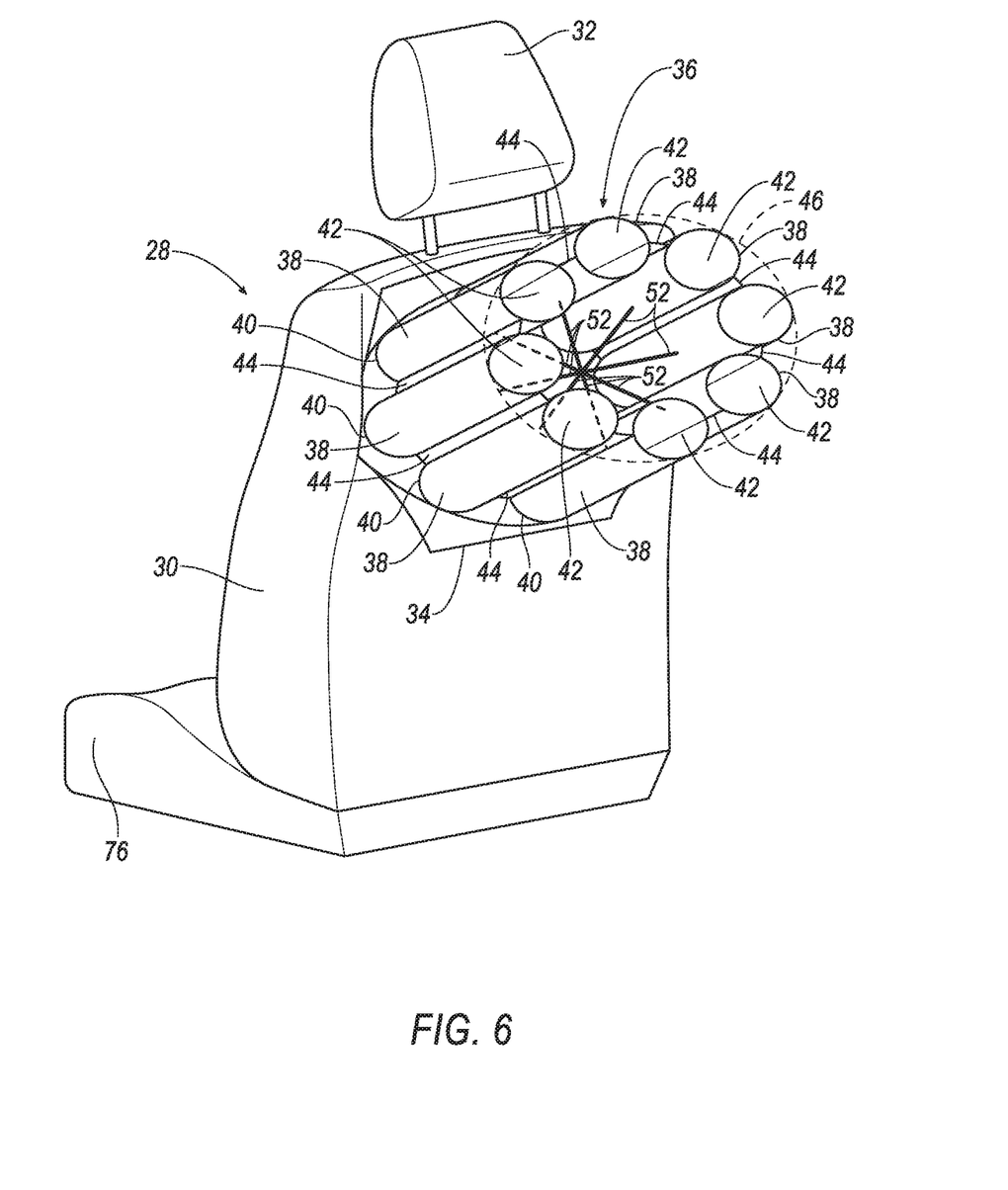
FIG. 6 is a perspective view of the seat assembly and one embodiment of the airbag assembly in the inflated position.

With reference to FIG. 6, the airbag assembly 36 may include a plurality of tethers 52 extending between the pipes 38. Each tether 52 may attach to one of the pipes 38 between the proximal end 40 and the distal end 42. For example, each tether 52 may attach to one of the pipes 38 between a midpoint, i.e., half of the length of the pipe 38, and the seat back 30. Each tether 52 may extend between nonadjacent pipes 38. That is, nonadjacent pipes 38 are separated from each other by more than just an interconnecting panel 44, e.g., nonadjacent pipes 38 are separated from each other by at least one other pipe 38 and two interconnecting panels 44.

Figure 7A:
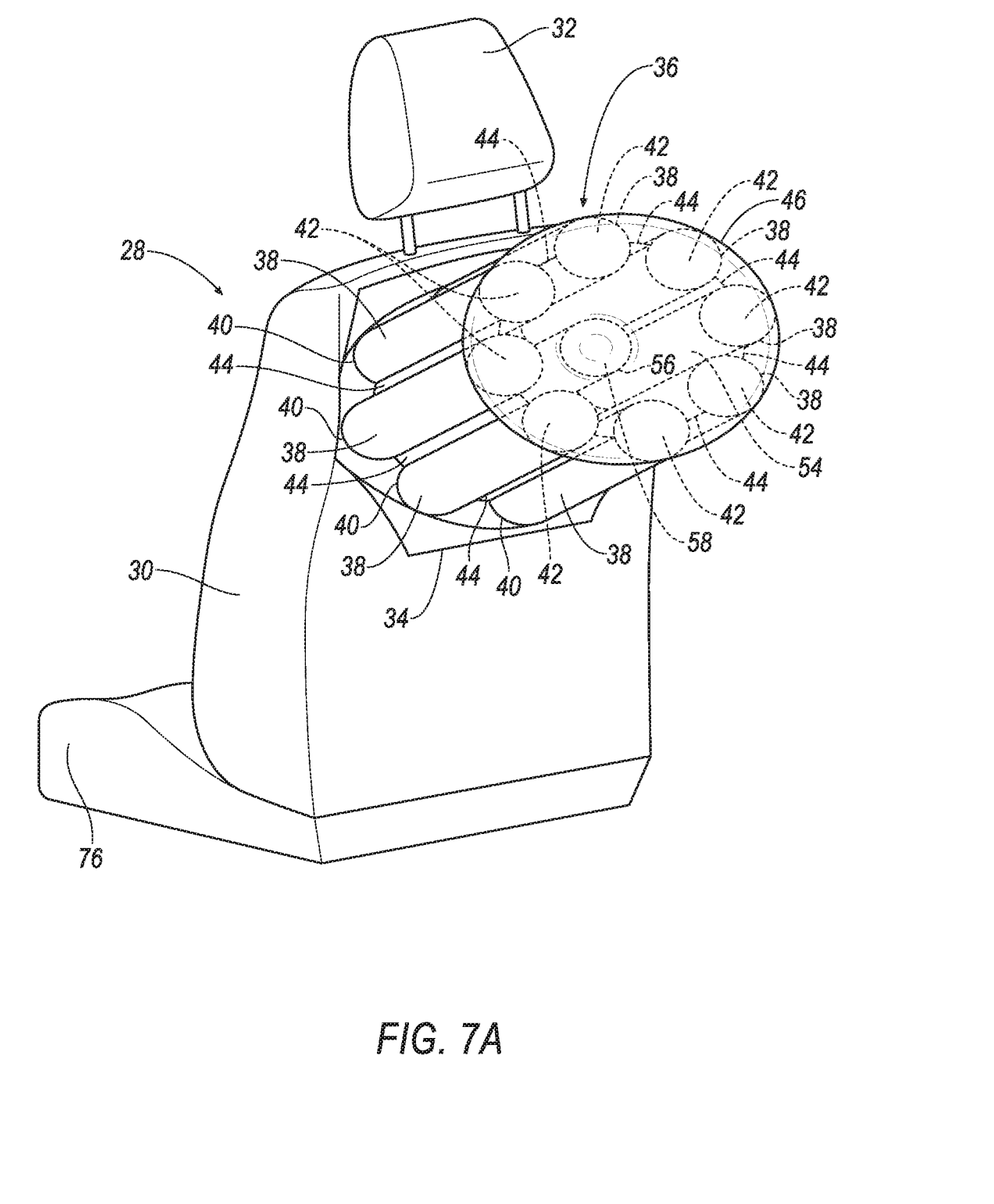
FIG. 7A is a perspective view of the seat assembly and another embodiment of the airbag assembly in the inflated position.
Figure 7B:
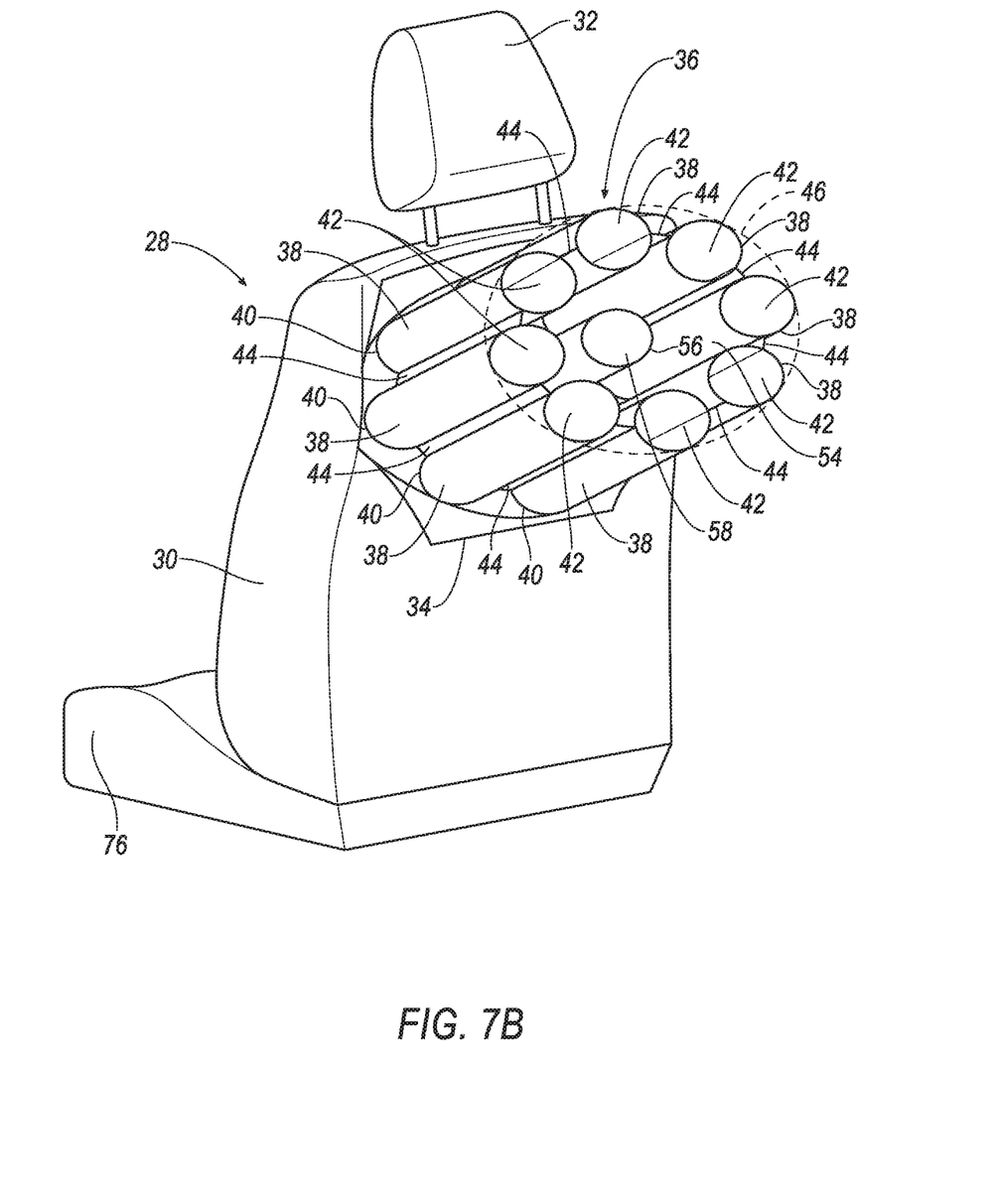
FIG. 7B is the view of FIG. 7A with a portion of the airbag assembly in hidden lines.

With reference to FIGS. 7A-7B, the airbag assembly 36 may include a middle pipe 56 in the cavity 54. That is, the middle pipe 56 may be surrounded by the plurality of pipes 38 and plurality of interconnecting panels 44. The middle pipe 56 has a proximal end (not shown) supported on the seat back 30 and a distal end 58 spaced from the proximal end. As one example, the uninflatable panel 46 may be fixed to the distal end 58 of the middle pipe 56. The middle pipe 56 may have a length from the proximal end to the distal end 58. The length of the middle pipe 56 may be less than lengths of the pipes 38, as shown in FIGS. 7A-7B, such that, in the inflated position, the uninflatable panel 46 is closer to the seat back 30 where it is fixed to the middle pipe 56 than where it is fixed to the plurality of pipes 38. In other words, the shorter length of the middle pipe 56 cups the uninflatable panel 46 and the uninflatable panel 46 is depressed at the middle pipe 56. As another example, the uninflatable panel 46 may be spaced from, and disconnected from the uninflatable panel 46. In this configuration, middle pipe 56 supports the uninflatable panel 46 if the uninflatable panel 46 is depressed a distance sufficient to contact the middle pipe 56 when the uninflatable panel 46 is impacted by the head 74 of the occupant 72.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly comprising:
   a plurality of pipes each having a distal end, the pipes being inflatable to an inflated position in which the distal ends are positioned in a circular configuration;
   a plurality of interconnecting panels in alternating arrangement with the plurality of pipes, each interconnecting panel fixed to adjacent ones of the plurality of pipes; and
   an uninflatable panel fixed to the distal ends of the plurality of pipes.

2. The airbag assembly of claim 1, wherein the pipes in the inflated position are elongated along pipe axes.

3. The airbag assembly of claim 2, wherein the plurality of interconnecting panels are elongated along axes parallel to the pipe axes.

4. The airbag assembly of claim 1, wherein each pipe includes a proximal end, and wherein the plurality of interconnecting panels are fixed to the pipes between the proximal ends and the distal ends.

5. The airbag assembly of claim 1, further comprising a plurality of tethers extending between the pipes.

6. The airbag assembly of claim 5, wherein each tether extends between nonadjacent pipes.

7. The airbag assembly of claim 1, wherein the pipes and interconnecting panels define a cavity therebetween, and further comprising a middle pipe in the cavity, each of the plurality of pipes and the middle pipe having a length, the length of the middle pipe being less than the lengths of the pipes.

8. The airbag assembly of claim 7, wherein the middle pipe has a distal end and the uninflatable panel is fixed to the distal end of the middle pipe.

9. The airbag assembly of claim 1, further comprising an inflator, a manifold in fluid communication with the inflator, and a plurality of fill tubes, each of the fill tubes in fluid communication with the manifold and a respective one of the pipes.

10. The airbag assembly of claim 1, wherein the distal ends of the plurality of pipes are spaced from each other.

11. A seat assembly comprising:
a seat back;
a plurality of pipes each having a proximal end supported on the seat back and a distal end, the pipes being inflatable to an inflated position in which the distal ends are positioned in a circular configuration;
a plurality of interconnecting panels in alternating arrangement with the plurality of pipes, each interconnecting panel fixed to adjacent ones of the plurality of pipes; and
an uninflatable panel fixed to the distal ends of the plurality of pipes.

12. The seat assembly of claim 11, wherein the pipes in the inflated position are elongated along pipe axes.

13. The seat assembly of claim 12, wherein the plurality of interconnecting panels are elongated along axes parallel to the pipe axes.

14. The seat assembly of claim 11, wherein the plurality of interconnecting panels are fixed to the pipes between the proximal ends and the distal ends.

15. The seat assembly of claim 11, further comprising a plurality of tethers extending between the pipes.

16. The seat assembly of claim 15, wherein each tether extends between nonadjacent pipes.

17. The seat assembly of claim 11, wherein the pipes and interconnecting panels define a cavity therebetween, and further comprising a middle pipe in the cavity, each of the plurality of pipes and the middle pipe having a length, the length of the middle pipe being less than the lengths of the pipes.

18. The seat assembly of claim 17, wherein the middle pipe has a distal end and the uninflatable panel is fixed to the distal end of the middle pipe.

19. The seat assembly of claim 11, further comprising an inflator, a manifold in fluid communication with the inflator, and a plurality of fill tubes, each of the fill tubes in fluid communication with the manifold and a respective one of the pipes.

20. The seat assembly of claim 11, wherein the distal ends of the plurality of pipes are spaced from each other.

\* \* \* \* \*